United States Patent [19]
Bolli

[11] 3,806,014
[45] Apr. 23, 1974

[54] VARIABLE SPEED DRIVE
[75] Inventor: Hans-Ulrich Bolli, Schaffhausen, Switzerland
[73] Assignee: SIG Schwaizerische Industrie-Gesellschaft, Neuhausen am Rheinhausen, Switzerland
[22] Filed: Apr. 3, 1973
[21] Appl. No.: 347,413

[30] Foreign Application Priority Data
Apr. 7, 1972 Switzerland.................... 005183/72

[52] U.S. Cl...................... 226/30, 74/63, 226/181, 226/188
[51] Int. Cl............................................. B65h 23/18
[58] Field of Search........... 226/27, 30, 40, 45, 134, 226/136, 137, 181, 188; 74/63

[56] References Cited
UNITED STATES PATENTS
3,028,064  4/1962  Thurlings............................ 226/30
2,977,730  4/1961  Ardner................................ 226/30 X
2,812,938  11/1957  Haskin et al........................ 226/30

Primary Examiner—M. Henson Wood, Jr.
Assistant Examiner—Gene A. Church
Attorney, Agent, or Firm—Spencer & Kaye

[57] ABSTRACT

A drive mechanism having a normal, fixed, transmission ratio between an input and an output shaft and having the shafts coupled together by a mechanism which can impart an additional incremental rotation to the output shaft during each revolution thereof. The mechanism includes a wheel having a sawtooth periphery fastened to the end of one shaft and a plate carrying one or a plurality of angularly spaced pawls fastened to the end of the other shaft. The pawls are mounted to resiliently engage in the teeth on the wheel periphery and to be movable along the sloping surfaces thereof. The plate and wheel are relatively shiftable to transversely offset the axes of the input and output shafts to permit such incremental movement to occur. The output shaft can rotate in one direction whether or not the input shaft is rotating, and with the shaft axes offset, the output shaft undergoes such additional incremental movement during each revolution thereof.

7 Claims, 8 Drawing Figures

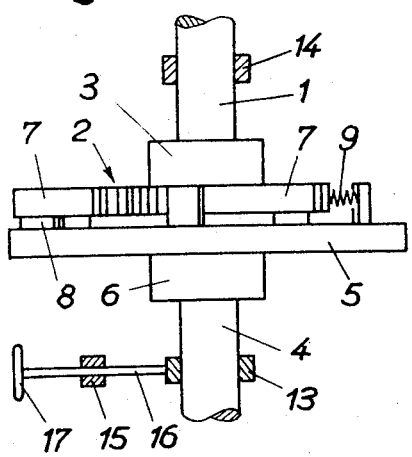
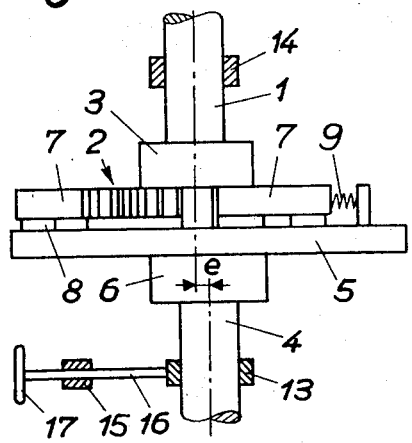
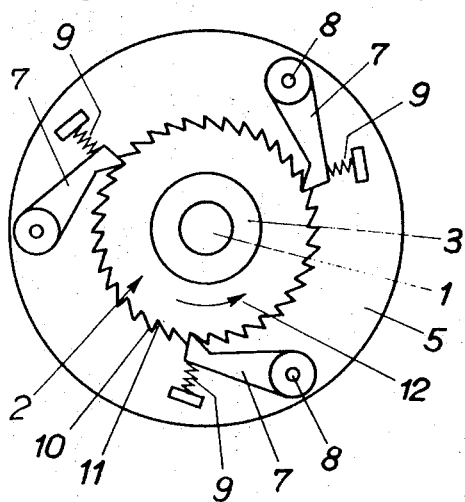
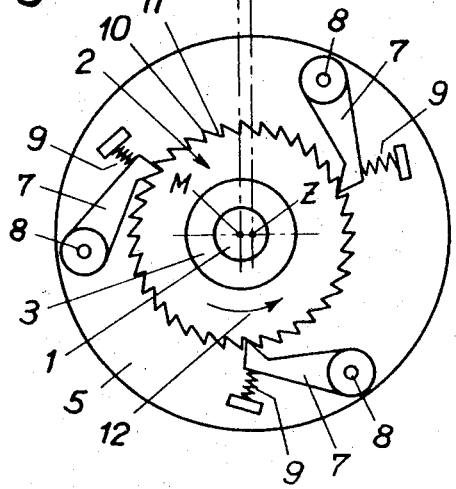

VARIABLE SPEED DRIVE

BACKGROUND OF THE INVENTION

The present invention relates to a rotary drive for driving an output shaft at a desired rate relative to an input shaft, and particularly to a drive permitting such relative rotation to be selectively varied.

In a drive mechanism with a fixed transmission ratio, the relation between angles of rotation $\alpha$ and $\beta$, of the input and output shafts is represented by the equation: $\beta = K \cdot \alpha$, if $\alpha$ and $\beta$ are the angles of rotation covered by the input and output shafts of the drive, starting from a certain point in time, K being a constant and the angles $\alpha$ or $K \cdot \alpha$ possibly containing full revolutions.

However, in numerous cases it is desired to provide a drive which operates according to the relationship: $\beta = K \cdot \alpha + \gamma$, i.e. the angle of rotation $\beta$ the output shaft is to be greater by an additional angle $\gamma$ than the degree of synchronization $K \cdot \alpha$, which it would have with a constant transmission ratio, this additional angle $\gamma$ being variable, if required. In principle, this relationship can be met by any drive with a continuously variable transmission ratio or by any drive in which two rotary movements can be superimposed on one another, a constant rotary movement and a variable rotary movement, such as is produced, for example, by differential or planet gear drives. These drives, however, are relatively expensive.

SUMMARY OF THE INVENTION

It is a primary object of the present invention to provide a relatively simple and inexpensive drive in which the angle of rotation of the output shaft can be varied with respect to the transmission ratio, i.e. the synchronization of the rotation of the output shaft to that of the input shaft.

This is accomplished, according to the present invention, in that the drive includes two shafts disposed with their axes of rotation substantially parallel and coupled together at their mutually facing ends to rotate together, with one shaft bearing a toothed wheel and the other shaft bearing a carrier disc on which a plurality of mutually offset pawls are mounted so that their free ends resiliently contact the periphery of the toothed wheel. The two shafts are mounted in bearings which can be moved relative to one another in the direction transverse to the axes of these shafts between a basic position in which the shaft axes are coaxial and in which all pawls are in driving engagement with the toothed wheel and an operating position in which the axes are transversely spaced from one another, i.e. are non-coaxial but parallel, and in which the pawls individually come into driving engagement with the toothed wheel in sequence so that, regardless of which one of the two shafts is the driving or the driven shaft, respectively, the driven shaft performs a revolution of more than 360° when the driving shaft performs a revolution of 360°.

Embodiments of the invention are particularly adapted to overcoming certain problems encountered in the packaging art, particularly for conveying a panel of foil-shaped material on which a series of pattern sections have been printed to a packaging machine. Embodiments of the invention will also find use in other fields of the art.

BRIEF DESCRIPTION OF THE DRAWINGS

FIG. 1 is a front elevational view of a first drive according to the invention in its basic position.

FIG. 1a is a view of the same drive in its operating position.

FIG. 2 is a plan view of the device as shown in FIG. 1.

FIG. 2a is a plan view of the device as shown in FIG. 1a.

DESCRIPTION OF THE PREFERRED EMBODIMENTS

Figure 3:
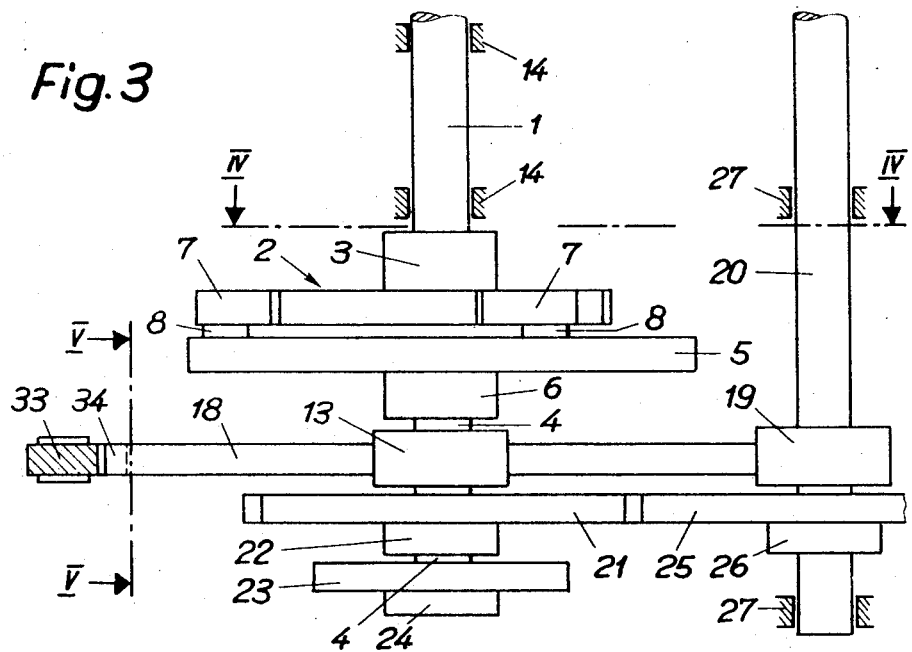
FIG. 3 is an elevational view sustantially of a second drive according to the invention, in a section taken along the line III—III of FIG. 4.

The drive shown in FIGS. 1 and 2 includes a driving shaft 1 having a toothed wheel 2 fastened at its lower end, via hub 3. A driven shaft 4 is provided and at its upper end there is disposed a disc 5 with a hub 6. Three pawls 7, which are angularly offset by 120° with respect to one another, are pivotally mounted on respective pins 8 having pivot axes parallel to the axes of shafts 1 and 4. Pawls 7 are biased to pivot toward the toothed wheel 2 by compression springs 9 so that these pawls contact the asymmetrical ratchet teeth 10 of toothed wheel 2, while engaging more or less deeply in the gaps 11 between the teeth.

In the operating state shown in FIGS. 1 and 2, the shafts 1 and 4 are axially aligned with one another and it can be seen that when the driving shaft 1 is rotated in the sense of arrow 12 of FIG. 2, the toothed wheel 2 drives disc 5, via pawls 7 to also rotate so that shaft 4 experiences the same rotation as shaft 1. When shaft 1 rotates in the opposite direction to that shown by arrow 12, shaft 4 is not driven and, if no other features were provided, this would merely constitute a known free-wheeling pawl coupling.

The drive according to the invention differs from such a coupling, however, in that the shaft 1 and 4 can be adjusted relative to one another from their coaxial basic position shown in FIGS. 1 and 2, while maintaining their axial orientations, so that the axis M of shaft 1 has a spacing $e$, from the axis Z of shaft 4, as shown in FIGS. 1a, and 2a.

To permit such relative adjustment between shafts 1 and 4, shaft 4 is mounted in a horizontally displaceable bearing 13 as shown in FIG. 1 while shaft 1 is mounted in a stationary bearing 14. For this purpose, bearing 13 is fastened to one end of a rod guided in a horizontal guide 15, the other end of the rod being provided with a handle 17.

As will be explained in detail below, due to the eccentric position of the two shafts 1 and 4 with respect to one another, the driven shaft 4 will rotate somewhat faster than the driving shaft 1, and the greater the eccentricity $e$, the higher the speed of shaft 4. Thus it is possible to increase the angle of rotation $\beta$ of shaft 4 with respect to the degree of synchronization $K \cdot \alpha$ which it would have with eccentricity $e = 0$, by an additional angle $\gamma$, as was required above. Since K = 1 in the illustrated embodiment, it can also be stated that shaft 4 can receive a lead with respect to shaft 1, which lead is the greater the farther bearing 13 is shifted out of the basic position by means of handel 17 and the longer it is held in this shifted position before it is returned to the basic position.

The drive shown in FIGS. 1 and 2 can also be operated when shaft 1 is standing still, i.e. by the deflection of shaft 4 relative to shaft 1 and the subsequent return to the basic position. With each such alternating movement, shaft 4 is rotated in position through a certain angle determined by the degree, $e$, of deflection. In order to assure such stepwise rotation in any desired position of the pawl disc, at least three pawls are necessary and should be angularly offset by 120° from one another. This makes it possible to effect any adjustments possibly required, prior to operation of the drive, in the simplest manner.

In the present case, shaft 1 is the input shaft of the drive and shaft 4 is the output shaft, but any other toothed wheels or gears, and shafts could be connected ahead of or behind these shafts. If shaft 4 is the output shaft, a drive shaft or a flexible shaft will be disposed between shaft 4 and the machine or the like to be driven in order to permit adjustment of bearing 13.

If it is initially assumed that only one pawl 7 is provided, that pawl will remain continuously in active engagement with toothed wheel 2, in that the free end of the pawl bears against a frontal face of a tooth 10, and after one full revolution of the toothed wheel, disc 5 will also have experienced a full revolution. With uniform rotation of shaft 1, however, the rotation of shaft 4 becomes irregular, i.e. in a certain angular range shaft 4 rotates faster and in another angular range it rotates slower than shaft 1.

If now $x$ more pawls are provided and if shafts 1 and 4 are offset from one another by the eccentricity "$e$", only one pawl can come into active, i.e. driving, engagement with the toothed wheel at a time and this in the angular region where disc 5 is rotating faster than toothed wheel 2. At the same time, the other pawls slide over the teeth, with the trailing edges of their free ends contacting the teeth.

Pawls 7 come into active engagement one after the other; when three pawls are provided, a new pawl comes into engagement every 120°. Consequently, disc 5 will always rotate at a higher speed than toothed wheel 2. The same is also the case if shaft 4 rotates regularly in the opposite sense of the arrow 12 and drives shaft 1. In this case, a plurality of pawls 7 rotate toothed wheel 2 faster, at an average, than disc 5.

Figure 4:
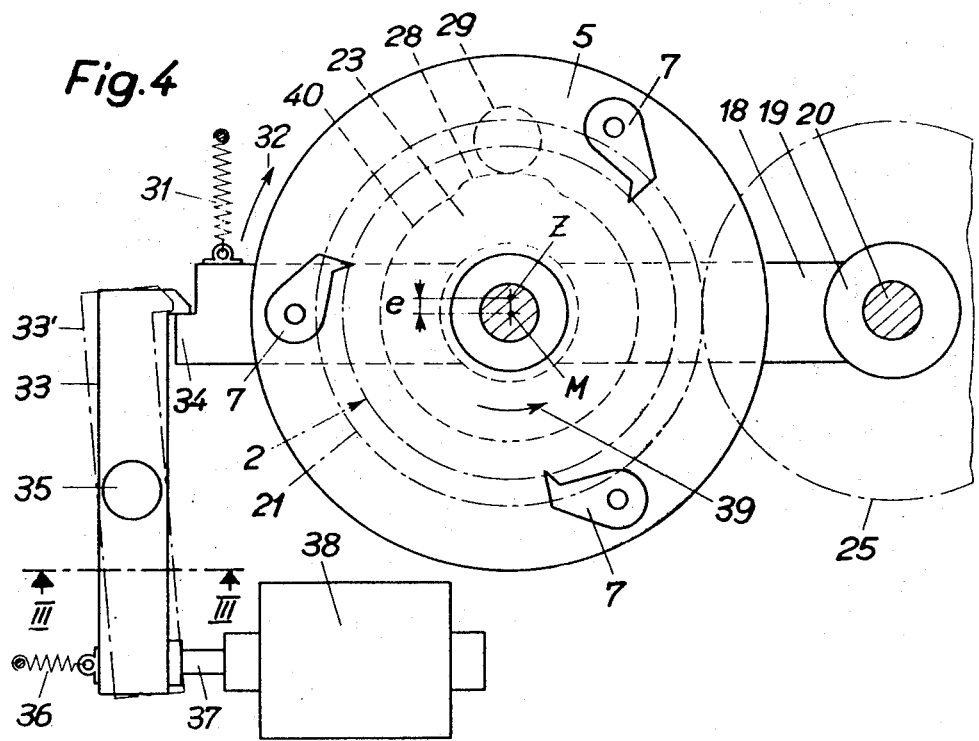
FIG. 4 is a cross-sectional plan view taken along line IV—IV of FIG. 3.
Figure 5:
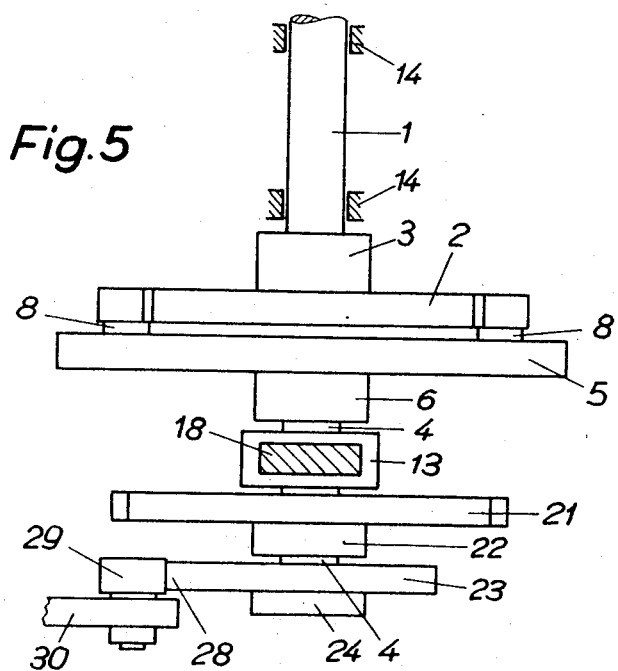
FIG. 5 is a cross-sectional side view taken along line V—V of FIG. 3.

The drive shown in FIGS. 3–5 is also provided with two mutually adjustable shafts 1 and 4 with a toothed wheel 2 and pawl support disc 5, and the associated details shown in FIGS. 1 and 2. Bearing 13 is disposed approximately in the center of a horizontal lever 18 having a hub 19 which is pivotally mounted on a shaft 20 whose axis is disposed parallel to the axes of shafts 1 and 4. Below bearing 13 a toothed wheel 21 with its hub 22 and a cam plate 23 with its hub 24 are fastened to shaft 4. Toothed wheel 21 engages in a toothed wheel 25 which is of identical size and which is seated with its hub 26 on shaft 20, shaft 20 being mounted in bearings 27 and constituting the output shaft of the drive.

Instead of the toothed wheel drive 21–25, it is of course also possible to use other corresponding drives. For example, a chain drive or a belt-driven gear could also be used.

The cam plate 23 has a constant radius over the major portion of its periphery and at only one point it has a protruding cam 28 which, in the illustrated position of the cam plate 23, contacts an abutment roller 29 wihich is rotatably mounted at the end of a setting lever 30 only partially shown in FIG. 5.

The bearing lever 18 is biased by a tension spring 31 which attempts to pivot the lever in the sense of arrow 32 of FIG. 2. Such pivoting is prevented, however, by a blocking hook 33 when the latter – as shown in solid lines — passes over a protrusion 34 of lever 18. The blocking hook 33 is pivotal about a vertical pin 35 and is biased by a tension spring 36 which attempts to hold it in the blocking position. The blocking hook 33 is also connected with the armature 37 of an electromagnet 38 which, when excited, pulls the armature 37 so that the blocking hook 33 is pivoted against the force of spring 36, into the position 33' shown in dot-dash lines, and releases bearing lever 18. The latter is then pivoted by spring 31 in the sense of arrow 32, provided protrusion 28 of cam plate 23 does not happen to rest on the abutment roller 29. If this should be the case, protrusion 28 will soon slide off of roller 29, since cam plate 28 is rotating together with shaft 4 in the sense of arrow 39 of FIG. 4. The bearing lever 18 then pivots to such an extent that the cam plate 23 contacts roller 29 along the main portion 40 of the cam plate periphery so that the axis of rotation Z of shaft 4 is displaced with respect to the axis of rotation M of shaft 1 by a distance "$e$" which is equal to the height of the protruding cam 28.

If it is desired for some reason to increase the angle of rotation of output shaft 20, i.e. to rotate it in the same direction by an additional angle, a control pulse is fed to electromagnet 38. This pulse causes the bearing lever 18 to be released from its basic position and to be brought into its operating position by spring 31. There it remains until cam 28 comes to lie below abutment roller 29 in the course of the revolution of plate 23. Thus bearing lever 18 is pivoted back; which enables spring 36 to bring the blocking hook 33 back into the blocking position. If it should occur that lever 18 is released at an instant such plate 23 only goes through a partial revolution before cam 28 contacts roller 29, and if the resulting additional forward rotation of shaft 4 is, as a result, less than desired, a further control pulse is fed to the electromagnet 38, etc.

The control may be so designed that the effect of the actuating pulse is electriclly or mechanically maintained until such time that the engagement then existing between cam 28 and roller 29 is terminated.

Figure 6:
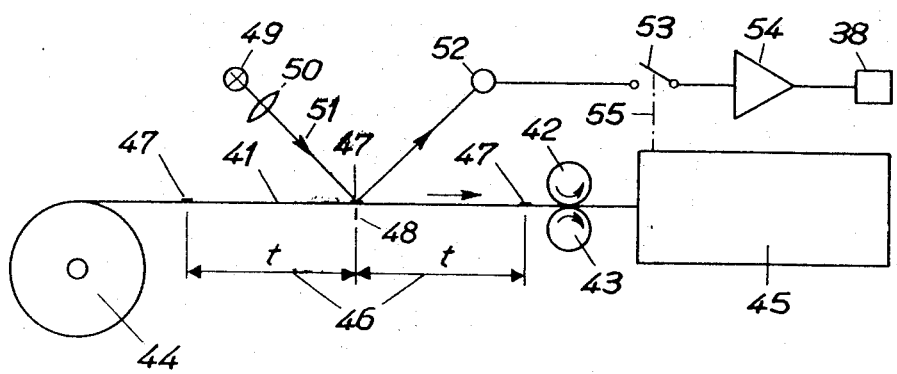
FIG. 6 is a simplified pictorial diagram illustrating one application of the drive of FIGS. 3–5.

FIG. 6 shows a particularly advantageous use for the drive shown in FIGS. 3–5. In the apparatus shown in FIG. 6, a paper panel 41 is removed from a supply roll 44 by means of two advancing rollers 42 and 43 which are coupled to rotate in respectively opposite directions and the paper panel 41 is then introduced into a packaging machine 45. The paper panel 41 is printed with the printed pattern repeating on the panel in successive, equidistant sections 46. Each section 46 is intended for an individual item to be packaged in machine 45 and care must be taken that a cutting device provided in machine 45 cuts a piece from the front end of panel 41 which corresponds as exactly as possible to a section of the printed pattern. If these cut-off pieces are only a little bit too long or too short, the errors accumulate so that the printed pattern will soon no longer appear on the package in the correct position.

In order to prevent this, it is necessary to correct the advance of the paper panel from time to time. This is done, for example, in that the advance rollers 42 and 43 are caused to move somewhat slower than corresponds to the spacing of the pattern sections 46 so that the cut sections become soemwhat shorter than this spacing t. Once the difference between the length of the cut-off pieces and the spacing t has reached a certain tolerance, e.g. 1 mm, the advance rollers 42 and 43 receive an additional forward rotation which compensates the error, whereupon the procedure is repeated. In order to be able to effect this forward rotation, one or the other of rollers 42 and 43 is fastened to the output shaft 20 of the drive of FIGS. 3–5 and it should be noted that this shaft 20 could also be horizontal or the axis of the supply roller 44 could be vertical.

In order to check whether the printed pattern sections 46 are in the correct position with respect to machine 45, a small light-reflecting coating 47 is printed, for example, at the border between two successive sections 46, preferably only in the vicinity of one longitudianl edge of panel 41. When coating 47 comes to lie opposite a stationary marker 48, it reflects a beam 51, which emanates from a light source 49 and which is sharply focused by an optic 50, onto a photocell 52. According to th simplified schematic diagram shown in the drawing, the output of the photocell 52 is connected with the input of an amplifier 54 via a switch 53, the output of the amplifier feeding the electromagnet 38.

Switch 53 is synchronized with machine 45 via a mechanical connection 55 so that the switch is opened once during each packaging cycle of the machine 45 and this occurs exactly during the short interval in which coating 47 is intended to pass marker 48. If coating 47 does pass marker 48 during that interval, the beam reflected onto photocell 52 does not result in an output pulse from amplifier 54.

If coating 47 comes too late into the range of marker 48, which will occur after a certain number of cycles because of the intentionally somewhat too slow movement of panel 41, it reflects beam 51 onto the photocell 52 while switch 53 is still closed. Consequently, the electromagnet 38 receives a pulse during the interval in which beam 51 impinges on photocell 52 and this pulse produces a certain forward rotation of shaft 20 and thus an additional advance of panel 41 as already described above. If this additional advance should not be sufficient, switch 53 would again be closed when the next coating 47 arrives at marker 53 and the above-described process would be repeated.

Other known circuits can also be employed for this purpose.

If the correction is intended to be generally made greater, for example when a packaging machine is supplied with longer printed pattern sections 46, the cam plate 23 can be exchanged for a cam plate of the same type but with a higher cam 28 so that the eccentricity "e" produced upon the arrival of a pulse and the resulting advance rotation of shaft 20 are correspondingly increased. It is clear, however, that the eccentricity cannot be arbitrarily increased without interfering with the operational capability of the drive.

It should also be noted that more or less than three pawls 7 can be mounted on disc 5, a minimum of two pawls being required so that they can alternatingly drive or be driven by toothed wheel 2. The number of three pawls 7 is of particular advantage in practice since a certain equalization of the faster or slower rotary movement of the output shaft which would be realized with a larger number of pawls 7 is of no significance. Instead of rigid pawls 7 loaded by springs 9 it is also possible to use pawls made of a resilient material.

It will be understood that the above description of the present invention is susceptible to various modifications, changes and adaptations and the same are intended to be comprehended within the meaning and range of equivalents of the appended claims.

I claim:

1. A rotary drive including a driving shaft and a driven shaft, in which the angle of rotation of the driven shaft can be varied with respect to its degree of synchronization with the driving shaft, the shafts being arranged parallel to, and facing, one another, said drive comprising: a toothed wheel fastened on one said shaft; a carrier disc fastened on the other said shaft; a plurality of mutually angularly offset pawls resiliently mounted on said carrier disc so that their free ends resiliently contact the periphery of said toothed wheel; bearings supporting said two shafts and mounted for movement with respect to one another in a direction transverse to the rotation axes of said shafts for moving said axes between a basic position in which they are coaxial and in which all said pawls are in driving engagement with the teeth of said wheel and an operating position in which said axes are spaced transversely from one another by a selected distance such that said pawls come individually into driving engagement with said wheel in sequence, whereby when said axes of said shafts are in said operating position, one revolution of said shaft causes said driven shaft to undergo a rotation of greater than one revolution.

2. An arrangement as defined in claim 1, further comprising a rod supporting the bearing for one said shaft and guide means supporting said rod for movement in a direction perpendicular to the axes of said shafts.

3. An arrangement as defined in claim 1, further comprising: a third shaft oriented with its axis parallel to those of said other two shafts; a lever pivotally mounted on said third shaft and supporting the bearing supporting one of said other two shafts; and transmission means coupled between said third shaft and said driven shaft for transmitting rotary movement therebetween.

4. An arrangement as defined in claim 3, further comprising a bias spring connected to said lever for urging it in a direction in which said axes of said driving and driven shafts are in said operating position; a blocking device normally holding said lever in a position corresponding to said basic position of said axes; a pulse control means connected for moving said blocking device out of its normal position, to permit said lever to be moved by said bias spring, upon the receipt of a control pulse; a cam plate mounted on said driven shaft and arranged to limit the degree of pivotal movement of said lever when said blocking device moves out of said normal position; said cam plate being provided with a protruding cam which returns said lever to the position corresponding to said basic position when said cam reaches a predetermined angular position, whereupon said lever is again held be said blocking device until a new control pulse arrives.

5. An arrangement as defined in claim 4 wherein said pulse control means includes an electromagnet.

6. An arrangement as defined in claim 4, further comprising a movable abutment constituted by a roller whose position is adjustable, said roller being disposed to contact said cam plate to limit the degree of pivotal movement of said lever when said blocking device moves out of its normal position.

7. A drive system for feeding a panel of foil-shaped material covered with a succession of printed pattern sections into a packaging machine, comprising: a drive arrangement as defined in claim 4; a pair of advancing rollers disposed for feeding the panel into the packaging machine, one of said advancing rollers being connected to be driven by said third shaft; means causing said pulse control means to produce control pulses to cause the number of synchronous revolutions of said third shaft to be such that during each operating cycle of the packaging machine, the machine receives a length of panel equal to one printed pattern section less an error amount; and control means associated with photoelectric means and arranged to determine when the sum of successive error amounts associated with successive panel lengths has exceeded a prescribed tolerance, to then supply an electrical pulse to said pulse control means for causing said lever to be pivoted into the operating position whereby an additional forward rotation is imparted to said third shaft and to said advancing rollers.

* * * * *

UNITED STATES PATENT OFFICE
CERTIFICATE OF CORRECTION

Patent No. 3,806,014  Dated April 23rd, 1974

Inventor(s) Hans-Ulrich Bolli

It is certified that error appears in the above-identified patent and that said Letters Patent are hereby corrected as shown below:

In the heading of the patent, line 4, change "Schwaizerische" to --Schweizerische--; line 6, change "Rheinhausen" to --Rheinfall--. Column 1, line 18, after "β" insert --of--; line 23, change "continously" to --continuously--. Column 2, line 11, change "sustantially" to --substantially--; line 46, change "shaft" to --shafts--. Column 3, line 4, change "handel" to --handle--. Column 5, line 9, change "soemwhat" to --somewhat--; lines 25 and 26, change "longitudianl" to --longitudinal--; line 30, change "th" to --the--. Column 7, line 3, change "be" to --by--.

Signed and sealed this 17th day of September 1974.

(SEAL)
Attest:

McCOY M. GIBSON JR.
Attesting Officer

C. MARSHALL DANN
Commissioner of Patents